United States Patent [19]

Jung

[11] 3,929,685

[45] Dec. 30, 1975

[54] PROCESS FOR PRODUCING CASTING MOLDS SUITABLE FOR USE IN THE CERAMIC INDUSTRY

[76] Inventor: Bruno Jung, Bleiholle 76, CH 4242 Laufen, Switzerland

[22] Filed: June 11, 1973

[21] Appl. No.: 368,919

Related U.S. Application Data

[63] Continuation-in-part of Ser. No. 211,646, Dec. 23, 1971, abandoned.

[52] U.S. Cl. ..... 260/2.5 HB; 260/2.5 R; 260/2.5 N; 260/2.5 L; 260/2.5 M; 260/29.6 RB; 260/29.6 ME; 260/29.6 WQ; 260/873; 260/884; 260/885; 260/886; 264/41; 264/225
[51] Int. Cl.² .................................................. C08J 9/24
[58] Field of Search ........... 260/2.5 N, 2.5 R, 2.5 L, 260/2.5 HB, 29.6 WQ; 264/225

[56] References Cited
UNITED STATES PATENTS

| | | |
|---|---|---|
| 3,244,772 | 4/1966 | Von Bonin et al. ............. 260/2.5 N |
| 3,256,219 | 6/1966 | Will ................................ 260/2.5 N |
| 3,442,842 | 5/1969 | Von Bonin et al. ............. 260/2.5 N |
| 3,465,066 | 9/1969 | Tanaka et al. .................... 260/2.5 N |
| 3,773,602 | 11/1973 | Killmer ............................ 264/225 |
| R27,444 | 7/1972 | Will ................................ 260/2.5 N |

Primary Examiner—Wilbert J. Briggs, Sr.
Attorney, Agent, or Firm—Neil F. Markva

[57] ABSTRACT

A process for producing casting molds suitable for use in the ceramic industry and consisting of a polymerized material having minute, open pores and possessing a high degree of mechanical strength and an excellent water permeability. There is formed a castable mixture comprising A. a major amount of a polymer powder composed of spherical particles and having a polymerization catalyst uniformly distributed over the entire surface of said particles,
B. an emulsion of at most about 20% by weight of water, based on said mixture; at least one water-insoluble, liquid monomeric or only partially polymerized compound polymerizable to form a rigid polymer and capable of being slightly imbibed by said polymer powder, as the oil phase; and a surface active agent capable of maintaining said emulsion; and optionally
C. an accelerator for the polymerization of said polymerizable compound.

Said mixture is cast to form a casting mold or a filter for liquid or gaseous media or the like, and then polymerized. Finally, the water can be removed from the pores.

19 Claims, No Drawings

PROCESS FOR PRODUCING CASTING MOLDS SUITABLE FOR USE IN THE CERAMIC INDUSTRY

This application is a continuation-in-part of copending application Ser. No. 211,646 filed Dec. 23, 1971, now abandoned.

BACKGROUND OF THE INVENTION

In the ceramic industry, various well-known techniques are used for shaping purposes. these techniques include primarily pressing in the dry or slightly moist state, forming in the plastic state and casting in the liquid state or slip casting. Gypsum is used almost exclusively as the material for making the molds used in casting processes in the ceramic industry. These are generally referred to as plaster molds. The primary advantages of using gypsum are that a simple processing is involved to form the plaster molds and the plaster molds have adequate water permeability together with minute pores. The primary disadvantage of plaster molds is that they have a short service life by reason of their inadequate corrosion resistance. For example, only about 100 castings can be made using the prior art plaster molds in the slip casting method. In addition, the mechanical strength of plaster molds is very low.

The slip-casting method is in principle a filtration process. Attempt has been made in the prior art to accelerate the slip-casting process by using positive pressures. For this purpose, the slip is exposed to a pressure of 5 to 50 kp/cm². The forming of the ceramic body no longer takes place as a result of the suction force of the capillaries of the mold but as a result of the pressure drop just as in the case of filtration. See for example the equation of Carman-Konzeny:

$$\frac{L^2}{T} = \frac{2\,PgE^3}{5\,(Sp)^2\eta(y-1)(1-E)^2}$$

In this case
L signifies the thickness of the filter cake (cm)
T signifies the filtration time (sec)
P signifies the filtration pressure (g/cm²)
E signifies the proportion of pores in the filter cake
Sp signifies the specific surface of the solid (cm²/cc)
$\eta$ signifies the viscosity of the suspending medium (poise)
g signifies the gravity constant (980 cm/sec²) and
y signifies the concentration of the slurry.

The pressure casting process requires a porous mold material having a uniform open pore structure, good surface properties and adequate mechanical strength. Therefore, plaster molds are not suitable for the pressure casting process, and there is a need for other mold materials which may be worked into molds simply and at low cost, preferably using the conventional methods for producing plaster molds.

Attempts have already been made in the prior art to use sintered metals and inorganic materials for molds in the ceramic industry. However, such attempts have been unsuccessful because neither the necessary uniform pore structure, nor the desired surface properties and the simple processing which is customary in the production of plaster molds can be achieved. Because of the very fine particle size of clays, the pore size and the pore structure of the mold material are decisive in preventing migration of the clay particles into the pores of the mold whereby the pore diameter would be diminished and the mold would be plugged. There exists a marked difference in performance between mold materials which are broadly porous and mold materials with a defined pore structure and permeability. Porosity should not be confused with permeability for the latter implies interconnected voids while the former embraces voids of all types.

A process for the production of porous plastics with a sponge or foam-like structure by polymerizing a monomer in a water-in-oil emulsion is disclosed in U.S. Pat. No. 3,256,219. This prior art process comprises forming a stable water-in-oil emulsion composed of
1. water or an aqueous medium forming the dispersed phase; and
2. as dispersion medium, an organic liquid containing
   a. a polymerizable organic liquid and
   b. an emulsifying agent;

if desired, shaping the emulsion to the desired product, polymerizing the polymerizable organic liquid in said water-in-oil dispersion to form the respective polymerization product without breaking the water-in-oil emulsion, and at least partly removing the water or aqueous medium (1) from the resulting porous product or plastic.

According to the specification and claims, the dispersed phase of said stable water-in-oil emulsion may consist of water or an aqueous solution containing not less than 25%, preferably not less than 75% by weight of water.

The dispersed phase may contain, besides water, other additives which are soluble in water, such as alcohols, lower organic acids, lower ethers, lower ketones, inorganic salts, organic liquids with a high dielectric constant or carbohydrates.

The polymerizable organic liquid consists of a polymerizable organic compound or at least two polymerizable organic compounds being copolymerizable with each other. The dispersion medium or continuous phase should in general contain at least 10% by weight of said polymerizable organic liquid. It is also possible to use a solution of one or more non-liquid, copolymerizable organic compounds in one or more liquid copolymerizable organic compounds. Compounds having at least one ethylenically unsaturated group, such as a group of the formula

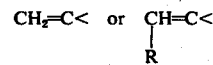

and/or

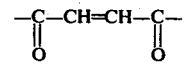

are particularly suitable as liquid polymerizable compounds. Examples thereof are compounds which contain, attached to an aromatic nucleus, vinyl or $\alpha$-alkyl vinyl groups such as styrene, divinyl benzene, o-, m-, p- and $\alpha$-methyl styrene; esters and ethers of vinyl alcohol such as vinyl acetate, divinyl phthalate, divinyl maleate, vinyl butyl ether, divinyl ethanediol ether; acrylic and methacrylic acid esters such as ethyl acrylate, 1,2-propanediol diacrylate, methyl methacrylate, ethanediol dimethacrylate, butene-2-diol-1,4 dimethacrylate; diethyl maleate; unsaturated hydrocarbon halides and cyanides such as vinylidene chloride, allyl chloride, chloroprene, acrylonitrile; unsaturated aliphatic hydrocarbons such as isoprene; and esters and ethers of allyl and methallyl alcohols such as diallyl phthalate, methallyl methyl fumarate, 1,2,3-tri(allyloxy)propane, diallyl diglycol carbonate, diallyl maleate. The particularly preferred polymerizable organic liquids are apparently styrene, methyl methacrylate and mixtures of styrene and acrylonitrile.

Many emulsifying agents are mentioned in U.S. Pat. No. 3,256,219. These may be organic compounds of low molecular weight which are not copolymerizable with the polymerizable organic liquid but are soluble therein (emulsifiers which are usually employed for preparing water-in-oil emulsions) or preferably polymerization and polycondensation products which are not copolymerizable with the polymerizable organic liquid but are soluble therein. Both types of emulsifying agents must, at least partly, be separated and precipitated from the dispersion medium at the phase boundary by the constituent of the dispersed phase, whereby they act as emulsifiers. Particularly preferred emulsifiers are certain polystyrenes and unsaturated polyesters.

In addition, the organic liquid serving as the continuous phase may contain plasticizers; non-copolymerizable polymers improving the elasticity, hardness, inflammability, etc. of the final products and the stability and other properties of the emulsion during its polymerization; copolymerizable polymers used for improving the electrical properties of the final products; and the like.

The water-in-oil emulsions may be polymerized in suitable molds, for instance, by casting. In order to increase the rate of production of such cast articles, a solid polymer either in the form of a powder or in the form of a highly viscous solution, may be added prior to the polymerization of the emulsion, thereby increasing the rate of polymerization.

In the preparation of shaped bodies, fibers and/or organic or inorganic filler materials may be admixed with the water-in-oil emulsion.

Additional emulsifiers suitable for the polymerization of polymerizable organic compounds in a reversed emulsion of the water-in-oil type are mentioned in U.S. Pat. Nos. 3,244,722; 3,442,842 and 3,465,066. U.S. Pat. No. 3,255,127 discloses a process for polymerizing polymerizable organic compounds in a reversed emulsion dispersed in water whereby polymers with a higher softening point are obtained; and U.S. Pat. No. 3,465,066 relates to a process for the production of high impact and shock resisting polymers in granular form in which a preliminary polymerization of a water-in-oil dispersion is carried out and thereafter said dispersion is inverted into an oil-in-water dispersion and polymerized until the polymerization is substantially completed in order to obtain the polymer in granular form. U.S. Pat. Nos. 3,255,127; 3,244,772; 3,442,842 and 3,465,066 do not teach the preparation of porous plastics which could be used as casting molds in the ceramic industry, more particularly in the pressure casting process.

The porous plastics produced according to U.S. Pat. No. 3,256,219 are likewise not suitable for said purpose because their pore structure is not sufficiently uniform. According to said patent the volume ratio of solid matter to pores can be regulated by a corresponding selection of the ratio between the compounds forming the continuous phase and the liquid forming the dispersed phase, while the diameter of the individual pores can be determined by producing a finer or coarser dispersion of the dispersed phase in the continuous phase. It is obvious that this method is not sufficiently reliable to consistently produce a material with a defined and homogeneous pore structure. It is another drawback that the mechanical properties of the plastic material produced by the process of U.S. Pat. No. 3,256,219 are inadequate as a result of its low density.

PURPOSE OF THE INVENTION

The primary object of this invention is to provide a casting mold suitable for use in the ceramic industry and consisting of a polymerized material having minute open pores and a uniform pore structure and possessing a high degree of mechanical strength and an excellent water permeability.

It is another object of this invention to provide a casting mold having about 10 to about 30% by volume of open pores, an average pore size of about 1 to about 20 microns, an excellent permeability and a uniform pore structure.

A further object of this invention is to provide a casting mold usable in slip-casting techniques and having a service life that is greatly increased over existing mold materials.

A still further object of this invention is to provide a process usable for the production of extremely diverse porous cast articles.

Another object of the invention is to provide a process suited for the production of casting molds for pressure casting of ceramic masses and of filters for liquid and gaseous mediums.

A further object of this invention is to provide a porous plastic material having open pores and a density of about 0.8 to about 1.0 grams/cc, a very uniform pore structure and an open pore volume of about 10 to about 30%.

A still further object of the invention is to provide a porous plastic material having a tensile strength of about 60 to about 150 kp/cm$^2$ and a compression strength of about 300 to about 450 kp/cm$^2$.

Another object of the invention is to produce a porous plastic mold using essentially the conventional methods for producing plaster molds without exposing the surface of the master mold to attack by solvents.

A further object of the invention is to overcome the above-mentioned difficulty that the pore size and pore structure of the mold material differ from batch to batch.

SUMMARY TO THE INVENTION

These objects and other advantages may be accomplished by consolidating polymer powders composed of spherical particles with a suitable polymerizable binder into a solid plastic material having open pores. Dependent on the particle size and particle size distribution of the polymer component, the porosity and average pore size of the porous plastic material may be varied within wide limits.

According to the invention, it is surprisingly possible to produce a porous plastic material having a high density and a uniform open pore structure by casting a castable mixture of a major amount of spherical polymer particles exhibiting a defined grading and a polymerizable binder, whereby the individual spherical polymer particles are adhered to each other at their contact surfaces by the polymerized binder.

Numerous experiments have unexpectedly shown that it is possible to use emulsions containing not more than about 20% by weight of water, based on the mixture of polymer powder and said emulsion, as the polymerizable binder, provided that the polymer powder has a polymerization catalyst uniformly distributed over the entire surface of the particles thereof. If the catalyst is dissolved in a solvent and/or added to the emulsion, or if it is suspended in the emulsion, then it is necessary to use more water so that the desired result is not achieved.

The process of the invention comprises the steps of forming a castable mixture comprising A. a major amount of at least one polymer component in the form of a free flowing powder composed of spherical particles and having a polymerization catalyst uniformly distributed over the entire surface of said particles:

B. an emulsion of at most about 20% by weight of water, based on said mixture: at least one water-insoluble liquid monomeric or only partially polymerized compound polymerizable to form a rigid polymer and capable of being slightly imbibed by said polymer powder, as the oil phase; and a surface active agent capable of maintaining said emulsion; and optionally C. an accelerator for the polymerization of said polymerizable compound;

casting said mixture to form a casting mold, polymerizing said polymerizable compound or compounds in said emulsion and finally removing the water from the pores of the mold thus produced.

Polymer powders are defined as polymeric materials having an average particle size of less than 500 micron. It is advantageous for 80% by weight of the polymer to have an average particle size of less than 200 microns. More preferably, 50% by weight of the polymer powder have an average particle size of less than 100 microns.

A major amount of polymer means more than 50% by weight, based on the castable mixture. Since the water content is at most about 20% by weight of the mixture, all the other constituents of the castable mixture must be at least about 80% by weight.

Polymer powders composed of spherical particles may be obtained by the prior art suspension polymerization. In addition to having spherical particles, the polymer powder must have a polymerization catalyst uniformly distributed over the entire surface of said particles, and it must be capable of slightly imbibing the polymerizable compound or compounds.

As catalysts, any of the conventional catalysts known to the man skilled in the art can be used. More particularly, catalysts such as lauroyl peroxide, benzoyl peroxide or the usually employed organic peroxides or azo compounds, such as azobisisobutyronitrile, can be used. The catalysts are usually present in amounts in the order of about 1% by weight, based on the polymer powder.

The packing and shape of the polymer particles are of prime importance for the present invention. The size and the size distribution or grading of the spherical polymer particles are largely decisive to the final pore size and pore structure of the polymerized plastic material produced. When spheres of equal size are packed together, it is impossible to produce a mass without voids. A mass with the minimum proportion of voids will result, if spheres of equal size are arranged in a closest packed hexagonal lattice. The ratio of voids to solid matter can be reduced still further by mixing spheres of different size so that the smaller spheres may fill to a certain extent the interstices between the larger spheres. This principle is used in the present invention, whereas according to the U.S. patents cited the pores are formed by the disperse phase of the emulsion. The mixing of polymer particles of different diameters in various proportions is desirable since the physical characteristics of the final mold material are improved. The properties of the final product are related both to the composition of the castable mixture and to the grading of the polymer components.

For the purposes of the invention, it does not matter whether a water-in-oil emulsion (or reversed emulsion) or an oil-in-water emulsion is formed, since it is not necessary for the dispersed phase to form the pores. The use of emulsions of water and liquid polymerizable compound or compounds has several advantages:

1. Due to the presence of water, the viscosity of polymerizable binding agent is lowered, thus facilitating uniform mixing of the castable mixture despite of the high proportion of solids in said mixture and the large specific surface of said solids. If no water were present, uniform mixing would only be possible if a higher proportion of liquid polymerizable compound were used. This would however result in an increased filling-up of the interstices between the spherical polymer particles which would change the porosity properties of the material produced.

2. Due to the presence of water, the contraction in volume occurring during the polymerization process may be minimized; it is possible to achieve contractions as low as less than 0.5% by volume.

3. The water additionally serves as a heat transfer medium during the polymerization process thus dissipating the heat of polymerization.

4. Furthermore, the water acts as a solvent for the surface active agents and accelerators.

It depends on the ratio of water to polymerizable compound or compounds (oil phase), whether an oil-in-water emulsion or a water-in-oil emulsion is obtained. This ratio is not critical and may be varied, provided that not more than 20% by weight of water, based on the castable mixture, are employed.

Any liquid monomeric or only partially polymerized compound or compounds polymerizable to form a rigid polymer and capable of being imbibed by the above-mentioned polymer powders may be used to form the emulsion. Thus, it is for example possible to use for the purposes of the invention, in combination, a poly(alkyl methacrylate), such as poly(methyl methacrylate), poly(ethyl methacrylate) or poly(butyl acrylate), and methyl methacrylate or an unsaturated polyester which may be dissolved in styrene. Other combinations of polymer and polymerizable compound or compounds are given below in the Examples. Additional suitable polymerizable compounds are mentioned in U.S. Pat. No. 3,256,219. Particularly useful compounds are monomeric esters of acrylic acid or methacrylic acid, vinyl acetate, vinylidene chloride, styrene or mixtures thereof.

Surface active agents capable of maintaining an oil-in-water emulsion are well-known to the man skilled in the art. Surface active agents capable of maintaining a water-in-oil emulsion are disclosed in U.S. Pat. Nos. 3,256,219; 3,255,127; 3,244,772; 3,442,842 and 3,465,066. Those skilled in the art will readily find out which of those surface active agents is most suitable for a given combination of polymer powder and oil-in-water or water-in-oil emulsion. Examples of useful surface active agents are the materials known under the registered trade marks TRITON (Rohm and Haas, Philadelphia, Pa., USA) and ANTAROX (General Aniline and Film Corp., New York, N.Y., USA). It is preferred to use non-ionic or anionic surface active agents. One particular advantage of non-ionics is the relatively low foam heigth produced in comparison to anionics. The surface active agents are normally used in amounts of about 1 to about 5% by weight, based on the castable mixture.

It is possible, although not absolutely necessary to employ also an accelerator for the polymerization of the polymerizable compound such as an amine accelerator, for example the material known under the trade mark "Amin-Beschleuniger A 302" (Elektrochemische Werke Muenchen AG, Hoellriegelskreuth near Munich, Western Germany). Other suitable accelerators are disclosed in U.S. Pat. Nos. 3,256,219; 3,255,217; 3,244,772; 3,442,842 and 3,465,066. The accelerators are in general employed in amounts in the order of about 0.2% by weight, based on the castable mixture.

The components of the castable mixture may be mixed together in an agitator mixer, but the method of mixing and the order in which the components of the mixture are added is not critical. The water is conveniently added together with the surface active agents. It is particularly important that the mixture of components is capable of being cast. That is, the liquid and solid components in the mixture should be present in amounts effective to form a castable mixture.

The homogeneous mixture of the components may then be cast into a suitable mold and polymerized at ambient temperature. The resultant porous plastic has a uniform pore structure, a high degree of mechanical strength and an extremely good water permeability. The intimate bond between the particles, even if they are very finely divided, results in good surface properties and ensures a satisfactory resistance against external influences, particularly the loosening of particles by flow action even upon prolonged use.

In contrast to other, prior art, methods for the production of plastics having open pores the process according to the invention makes possible the production of plastics having a very regular pore structure and a density of more than 0.8 gr/ccm as well as about 30% by volume of open pores. By a "regular pore structure" is meant that the pores are of approximately the same size and are uniformly distributed throughout the polymerized material. Although the polymeric materials thus obtained are particularly suitable as casting molds for pressure casting of ceramic materials, they are also useful as filters for liquid and gaseous media and other porous shaped articles. Practical experiments have shown that in pressure casting at a slip pressure of 50 kp/cm$^2$ a service life of the mold of more than 10,000 castings is achieved.

The following specific examples illustrate the process of the instant invention.

EXAMPLE 1

100 parts by weight of powder "DV 400" (Imperial Chemical Industries Limited, London, Great Britain), a poly(methyl methacrylate) powder composed of spherical particles with an average particle size of less than 300 micron and having a polymerization catalyst uniformly distributed over the entire surface of said particles; 30 parts by weight of monomeric methyl methacrylate DEGALAN (Degussa, Frankfort on the Main, Western Germany); 20 parts by weight of water; 5 parts by weight of ANTAROX (General Aniline and Film Corp., New York, N.Y., USA), a surface active agent; 0.2 parts by weight of Amin-Beschleuniger A 302 (Elektrochemische Werke Muenchen AG, Hoellriegelskreuth near Munich, Western Germany), an accelerator; are mixed together, observing the normal precautions for such purposes, whereby a stable water-in-oil emulsion is obtained, which is poured into a mold and polymerized at ambient temperature. A material is formed having about 10% by volume of open pores, an average pore size of 30 microns, a density of 1.0 g/cc, a tensile strength of 100 kp/cm$^2$ and a compression strength of 400 kp/cm$^2$. The water may be driven from the material after removal from the mold by heating to 60°C. or by means of compressed air.

EXAMPLE 2

The procedure of Example 1 is followed but an unsaturated polyester dissolved in styrene (styrene content 50% by weight) is used as the monomeric liquid compound. A material is obtained having likewise about 10% by volume of open pores and an average pore size of 20 microns.

EXAMPLE 3

100 parts by weight of poly(methyl methacrylate) powder composed of spherical particles and having a polymerization catalyst uniformly didstributed over the entire surface of said particles; 20 parts by weight of methyl methacrylate; 30 parts by weight of water; 6 parts by weight of a non-ionic surface active agent; and 0.2 parts by weight of Amin-Beschleuniger A-302 are used in the procedure of Example 1, whereby an oil-in-water emulsion is obtained.

The material hardens within 25 minutes at 80°C. The mold thus obtained contains more than 15% by volume of open pores and has a lower density than the product of Example 1. Consequently, the tensile strength and the compression strength are slightly less than those of the product of Example 1.

EXAMPLE 4

100 parts by weight of poly(methyl methacrylate) powder composed of spherical particles and having a polymerization catalyst uniformly distributed over the entire surface of said particles; 20 parts by weight of poly(ethyl methacrylate) powder composed of spherical particles and having a polymerization catalyst uniformly distributed over the entire surface of said particles; 50 parts by weight of methyl methacrylate; 15 parts by weight of water; 6 parts by weight of a non-ionic surface active agent [a poly(alkylene oxide) condensate]; 0.2 part by weight of accelerator; are used in the procedure of Example 1. The material hardens rapidly and very uniformly, so that it is particularly useful for the manufacture of rather large shaped articles. The hardened material has a higher flexural strength than the products of Examples 1 to 3.

EXAMPLE 5

60 parts by weight of poly(methyl methacrylate) powder composed of spherical particles and having a polymerization catalyst uniformly distributed over the entire surface of said particles; 20 parts by weight of poly(butyl methacrylate) powder composed of spherical particles and having a polymerization catalyst uniformly distributed over the entire surface of said particles; 40 parts by weight of poly(ethyl methacrylate) powder composed of spherical particles and having a polymerization catalyst uniformly distributed over the entire surface of said particles; 50 parts by weight of methyl methacrylate; 40 parts by weight of water; 5 parts by weight of a non-ionic surface active agent [a poly(alkylene oxide) condensate]; 0.3 part by weight of an amine accelerator; are used in the procedure of Example 1.

The material thus produced contains more than 20% by volume of open pores with an average pore size of 20 microns and has a higher flexibility than the products of Example 1 to 4. It is particularly suitable for applications requiring high impact strength. Its density is 0.9 gr/cc, its modulus of elasticity is 400 kg/mm$^2$, its modulus of rupture is 65 kg/cm$^2$ and its compressive strength is over 300 kg/cm$^2$.

EXAMPLE 6

120 parts by weight of poly(methyl methacrylate) composed of spherical particles and having a polymerization catalyst uniformly distributed over the entire surface of said particles; 25 parts by weight of ethyl methacrylate; 25 parts by weight of methyl methacrylate; 30 parts by weight of water; 8 parts by weight of a non-ionic surface active agent [a poly(alkylene oxide) condensate]; are used in the procedure of Example 1. This material has a higher hardness than the products of Examples 1 to 5 and good mechanical wear properties. Said properties are particularly important for molds to be used in the pressure casting of ceramic materials.

EXAMPLE 7

80 parts by weight of poly(methyl methacrylate) composed of spherical particles having an average diameter of 200 microns and having a polymerization catalyst uniformly distributed over the entire surface of said particles; 40 parts by weight of poly(methyl methacrylate) composed of spherical particles having an average diameter of 50 microns and having a polymerization catalyst uniformly distributed over the entire surface of said particles; 50 parts by weight of monomeric methyl methacrylate; 30 parts by weight of water; 8 parts by weight of a non-ionic surface active agent; are used in the procedure of Example 1. By mixing spherical polymer particles of two different sizes a closer packing of the polymer particles results, because the smaller particles will occupy a part of the voids between the larger particles. Consequently the pore size is reduced and the quality of the surface and the physical properties are improved.

Having thus set forth the nature of this invention what is claimed is:

1. A process for producing casting molds suitable for use in the ceramic industry, said process comprising the steps of:
   a. forming a castable mixture of an emulsion and a major amount of at least one polymer component,
   b. said polymer component being in the form of a powder composed of spherical particles and having a polymerization catalyst uniformly distributed over the entire surface of said particles,
   c. said emulsion comprising at most 20% by weight of water based on said castable mixture, a surface active agent capable of maintaining said emulsion, and a polymerizable compound comprising at least one water insoluble liquid monomeric or only partially polymerized compound polymerizable to form a rigid polymer and capable of being slightly imbibed by said polymer powder as the oil phase,
   d. casting said castable mixture to form a casting mold,
   e. polymerizing said polymerizable compound, and
   f. removing the water from the pores of the mold thus produced.

2. The process as defined in claim 1 wherein said emulsion includes an accelerator for the polymerization of said polymerizable compound.

3. A process as defined in claim 2 wherein the castable mixture consists essentially of 100 to 150 parts by weight of said polymer powder, 5 to 50 parts by weight of water provided that said water does not comprise more than 20% by weight of said castable mixture, 5 to 60 parts by weight of said polymerizable compound.

4. A process as defined in claim 1 wherein said polymer powder is selected from the group consisting of poly(methyl methacrylate), poly(butyl methacrylate), poly(ethyl methacrylate), copolymers of acrylic and methacrylic acid and the esters thereof, and mixtures thereof.

5. A process as defined in claim 1 wherein said polymerizable compound is selected from the group consisting of esters of methacrylic and acrylic acid and mixtures thereof.

6. A process as defined in claim 1 wherein said polymerizable material consists essentially of styrene.

7. A process as defined in claim 1 wherein said polymerizable compound consists essentially of an unsaturated polyester dissolved in styrene.

8. A process as defined in claim 1 wherein about 80% by weight of said polymer powder has an average particle size finer than 200 microns.

9. A process as defined in claim 1 wherein the polymer components consist of two or more fractions having different average particle sizes.

10. A process as defined in claim 1 wherein said polymer powder is selected from the group consisting of poly(methyl methacrylate), poly(butyl methacrylate), poly(ethyl methacrylate), copolymers of acrylic and methacrylic acid and the esters thereof, and mixtures thereof,
said polymerizable compound is selected from the group consisting of esters of methacrylic and acrylic acid and mixtures thereof.

11. A process as defined in claim 1 wherein said polymer powder is selected from the group consisting of poly(methyl methacrylate), poly(butyl methacrylate), poly(ethyl methacrylate), copolymers of acrylic and methacrylic acid and the esters thereof, and mixtures thereof,
said polymerizable material consists essentially of styrene.

12. A process as defined in claim 1 wherein said polymer powder is selected from the group consisting of poly(methyl methacrylate), poly(butyl methacrylate), poly(ethyl methacrylate), copolymers of acrylic and methacrylic acid and the esters thereof, and mixtures thereof,
said polymerizable compound consists essentially of an unsaturated polyester dissolved in styrene.

13. A process as defined in claim 1 wherein said polymer powder is selected from the group consisting of poly(methyl methacrylate), poly(butyl methacrylate), poly(ethyl methacrylate), copolymers of acrylic and methacrylic acid and the esters thereof, and mixtures thereof, about 80% by weight of said polymer powder has an average particle size finer than 200 microns.

14. A process as defined in claim 1 wherein
said polymer powder is selected from the group consisting of poly(methyl methacrylate), poly(butyl methacrylate), poly(ethyl methacrylate), copolymers of acrylic and methacrylic acid and the esters thereof, and mixtures thereof,
the polymer components consist of two or more fractions having different average particle sizes.

15. A process as defined in claim 1 wherein
the castable mixture consists essentially of 100 to 150 parts by weight of said polymer powder, 5 to 50 parts by weight of water provided that said water does not comprise more than 20% by weight of said castable mixture, 5 to 60 parts by weight of said polymerizable compound,
said polymer powder is selected from the group consisting of poly(methyl methacrylate), poly(butyl methacrylate), poly(ethyl methacrylate), copolymers of acrylic and methacrylic acid and the esters thereof, and mixtures thereof.

16. A process as defined in claim 15 wherein
about 80% by weight of said polymer powder has an average particle size finer than 200 microns.

17. A process as defined in claim 15 wherein
the polymer components consist of two or more fractions having different average particle sizes.

18. A process as defined in claim 1 wherein
said polymerizing step is effective to produce a solid plastic material casting having open pores with a density of 0.8 to 1.00 grams/cc, a uniform pore structure and a pore volume of about 10 to about 30%.

19. A process as defined in claim 1 wherein
said polymerizing step is effective to produce a solid plastic material casting having open pores with a density of 0.8 to 1.00 grams/cc, about 30% open pores, an average pore size of 1 to 20 microns, a tensile strength of about 60 to about 150 kp/cm$^2$ and a compression strength of about 300 to about 450 kp/cm$^2$.

* * * * *